United States Patent [19]

Kelpin

[11] 4,322,208
[45] Mar. 30, 1982

[54] SWIVEL MOUNTED PROPULSION AND STEERING APPARATUS

[75] Inventor: Thomas G. Kelpin, Shreveport, La.

[73] Assignee: Beloit Corporation, Beloit, Wis.

[21] Appl. No.: 186,436

[22] Filed: Sep. 12, 1980

Related U.S. Application Data

[63] Continuation of Ser. No. 949,636, Oct. 10, 1978, abandoned.

[51] Int. Cl.$^3$ ............................................. B60F 3/00
[52] U.S. Cl. ................................. 440/37; 114/144 R; 440/53
[58] Field of Search ........................ 114/144 R, 67 A; 440/37, 8, 53, 58; 244/23 R; 60/906; 123/98; 74/501 R, 501.5 R, 502; 180/7 P, 116, 117

[56] References Cited

U.S. PATENT DOCUMENTS

| | | | |
|---|---|---|---|
| 1,863,989 | 6/1932 | Liisanantti | 114/144 R X |
| 2,070,405 | 2/1937 | Irgens | 114/144 R X |
| 2,438,548 | 3/1948 | Ehmann | 74/501 X |
| 2,743,624 | 5/1956 | Schroeder | 114/144 R X |
| 2,914,013 | 11/1959 | Bizjak | 180/7 P X |
| 2,957,353 | 10/1960 | Babacz | 74/501 |
| 2,972,327 | 2/1961 | Paul | 180/117 |
| 3,088,330 | 5/1963 | Thompson | 74/501 |
| 3,188,995 | 6/1965 | Barten | 440/37 X |
| 3,341,125 | 9/1967 | Sweeney et al. | 180/117 X |
| 3,698,163 | 10/1972 | Kelpin | 440/37 X |
| 3,847,105 | 11/1974 | Kelpin | 440/37 |
| 3,890,771 | 6/1975 | Kelpin | 440/37 X |
| 3,964,426 | 6/1976 | Lindsey | 114/144 R X |

FOREIGN PATENT DOCUMENTS 74969  2/1959  France ........................... 114/144 R Primary Examiner—Douglas C. Butler
Attorney, Agent, or Firm—Dirk J. Veneman; Gerald A. Mathews; Michael L. Gill

[57] ABSTRACT

An apparatus for mounting and permitting swivel movement through 360° of an engine driven aerodynamic propeller type of propulsion and steering unit such as used on aquatic craft. The engine and propeller are mounted on a pedestal which in turn is mounted to swivel about an axis substantially normal to the boat deck. The engine throttle cable is connected to an unique universal coupling which permits axially reciprocal movement of the throttle cable, and thereby control of the engine, independent of either the position of the engine or the extent of the rotational movement of the propulsion unit relative to the platform on which it is mounted. The propeller is connected to the engine by a centrifugal clutch to permit the engine to be started and idled without operating as a propulsion device.

3 Claims, 5 Drawing Figures

SWIVEL MOUNTED PROPULSION AND STEERING APPARATUS

CROSS REFERENCE TO RELATED APPLICATION

This application is a continuation of application Ser. No. 949,636 filed Oct. 10, 1978 and now abandoned.

BACKGROUND OF THE INVENTION

This invention relates generally to a propulsion unit, more specifically to a marine propulsion and steering unit and still more specifically to an aerodynamic propeller type of propulsion unit commonly used to propel flat bottomed, aquatic craft sometimes referred to as "air boats". Even still more particularly, this invention relates to apparatus which permits the swivel mounting of an internal combustion engine powering a propeller and having a throttle cable so that the propeller can rotate 360° in either direction starting from any position, and continue rotating if desired, while permitting continuous control of the throttle.

Prior aerodynamic propeller type propulsion devices operate to steer the aquatic craft by either mounting a pivoted rudder-like vane on the boat behind the propeller while securing the propeller in a stationary mounting, or by pivotally mounting the propeller and engine. In either case, the ability of the steering apparatus to maneuver the craft is limited. In the case of the rudder-like vane, any lateral movement of the craft always must include a forward component of motion which is often unwanted. In prior apparatus wherein the propeller is pivotally mounted, the convenience and versatility in maneuvering the craft is compromised by the inability of the pivotally mounted propulsion apparatus to be able to rotate the desired distance and continue to rotate in a given direction from any starting position. This is because the throttle control cable cannot accommodate an unlimited amount of twisting, which would accompany an unlimited amount of engine and propeller rotation, without becoming so twisted and kinked as to be incapable of functioning. Thus, if the propeller (which operates in the "pusher" configuration) were substantially facing the pilot in position to reverse the direction of the craft, and it is desired to turn the craft from its travel in the reverse direction, this can only be accomplished if the turn were in the direction from which it had come because the pivotally mounted propulsion apparatus could not continue to rotate and pass through, for example an imaginary vertical plane extending along the longitudinal axis of the craft. Thus, even though the desired rotational movement of the propeller from its present position is, say, 30°, it might have to rotate back around through 330° of rotation in order to prevent the throttle control cable from becoming too twisted to function.

SUMMARY OF THE INVENTION

This invention obviates the need for restricting the rotary motion of a rotatably mounted propulsion apparatus and thereby permits an optimal variety of motion and control. The craft on which the propulsion apparatus is mounted can thus move straight forward, straight backward and any direction in between by moving the propulsion apparatus to the appropriate position along the shortest path from its previous location without regard to whether it must pass through the 360° position (taking the 0° and 360° positions as being in an imaginary vertical plane through propulsion apparatus in the direction from the aft to the forward end of the craft).

This invention also obviates the problems associated with the lack of steering versatility inherent in a pivotally mounted propulsion apparatus which cannot rotate through a complete 360° turn. It accomplishes this by mounting the propulsion apparatus on a shaft which swivelly rotates about a substantially vertical axis. There is nothing limiting the rotatable motion of the propulsion apparatus in either direction about the vertical axis, and it can rotate in as many complete turns about the axis in either direction as desired. For safety, as well as practical, reasons, control of the propulsion of the craft in general, and the engine throttle in particular, is essential regardless of the position of the propulsion apparatus for the number of turns it takes to arrive in its position.

This control is accomplished by interposing a unique universal coupling in the throttle cable. This coupling permits axial translation of the throttle cable along its entire length to control the throttle setting as well as unlimited rotational movement of the end of the cable attached to the engine. This is accomplished by mounting one end of the throttle control cable to the coupling body and the other end to a shaft having a head secured in the coupling body for swiveling movement within the coupling body.

A feature of the invention which enhances its operation, especially in conjunction with the universal coupling on the throttle cable, is the use of a centrifugal clutch mounted on the engine arbor linking the engine with the propeller. Since the essential components of the propulsion apparatus are control of the alignment of the propulsion apparatus and the speed of the engine, an important factor regarding the speed of the engine is the status of whether the propeller is engaged or disengaged. By using a centrifugal clutch, the engagement of the propeller essentially becomes a function of the engine speed which in turn is controlled by the throttle cable. Thus, this apparatus provides complete and continuous control of the direction and amount of propulsive force.

Accordingly, it is an object of this invention to provide an engine driven aerodynamic propeller type propulsion and steering apparatus capable and exerting propulsive force in any radial direction along a 360° turn.

Another object of the invention is to provide an engine driven aerodynamic propeller type propulsion and steering apparatus capable of turning 360° in either direction starting from any position.

Another object of the invention is to provide a swiveling, engine driven aerodynamic propeller type propulsion and steering apparatus wherein the engine throttle is controllable at any position along a 360°, or greater, turn.

Still another object of the invention is to provide an engine driven aerodynamic propeller type propulsion and steering apparatus wherein the engagement of the propeller is a function of engine speed.

A feature of this invention is the use of a centrifugal clutch mounted between the engine and the propeller providing the propulsive force.

An advantage and object of this invention is the ability to provide propulsive force in any direction regardless of the orientation of the craft on which the propulsion unit is mounted.

These and other objects, features and advantages of the invention will become readily apparent to those skilled in the art when the following description of the preferred embodiment is read in conjunction with the attached drawings.

DESCRIPTION OF THE PREFERRED EMBODIMENT

Figure 1:
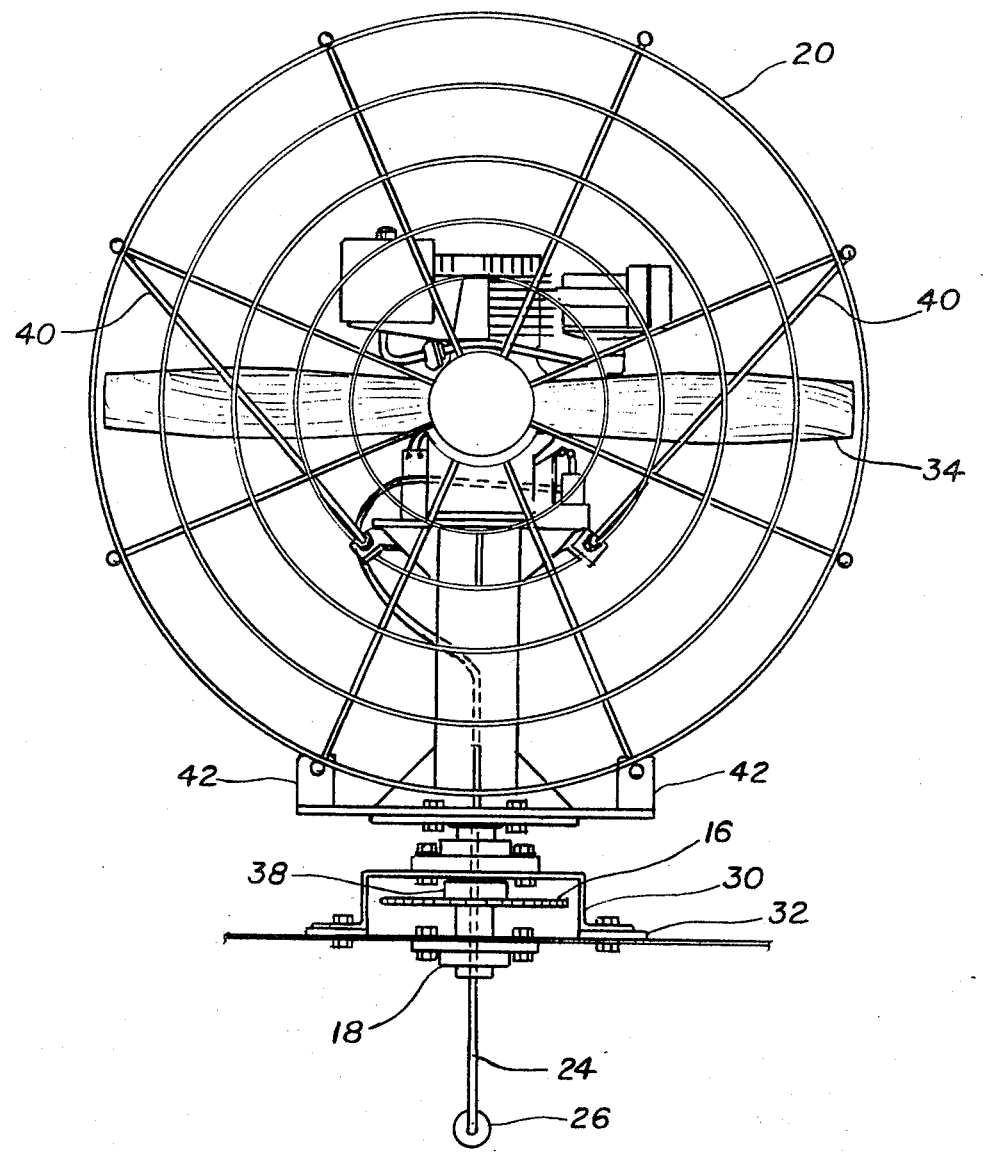
FIG. 1 is a rear elevation view of the propulsion and steering apparatus.
Figure 2:
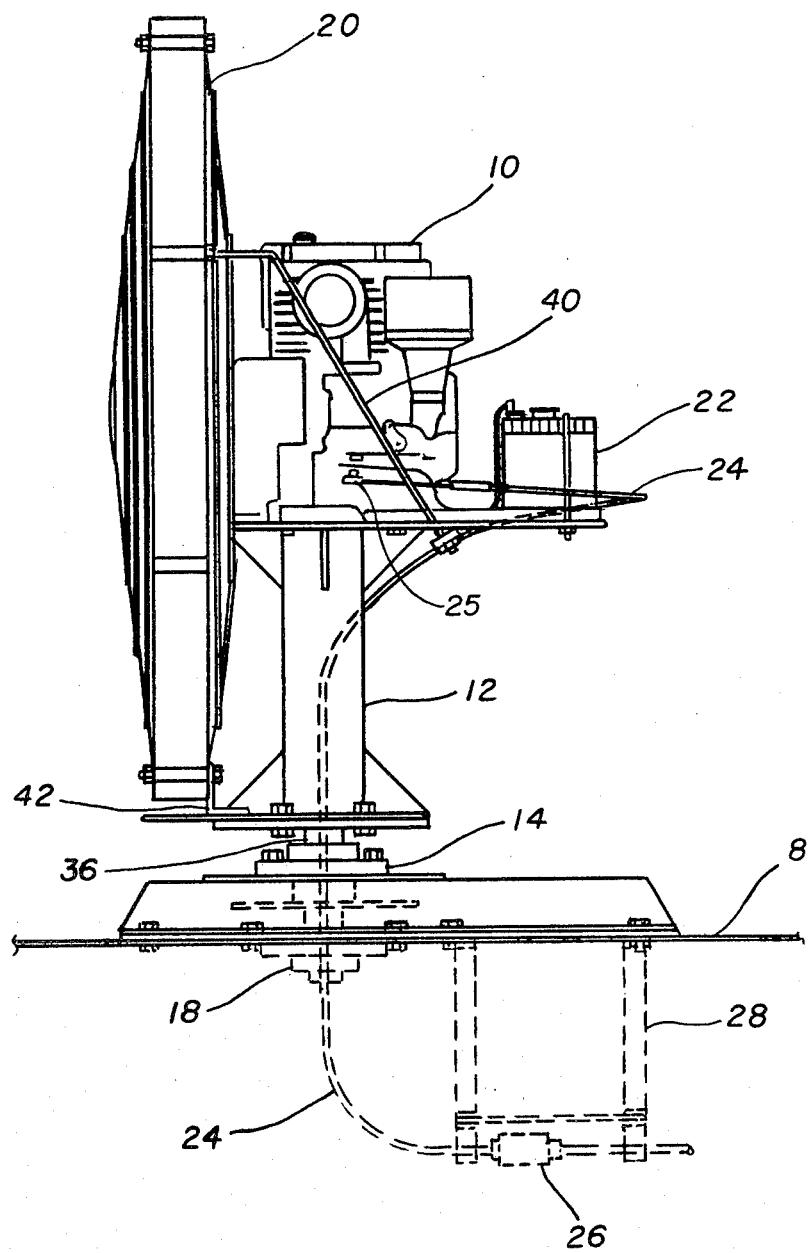
FIG. 2 is a side elevation view of the apparatus shown in FIG. 1.

FIGS. 1 and 2 illustrate the apparatus in its preferred configuration. Engine 10, such as an 11 horsepower Briggs and Stratton 4 cycle engine, is mounted on a pedestal 12 which in turn includes a shaft 36 rotatably mounted to swivel in a structural shroud 30 through flanged upper and lower bearing housings 14, 18, respectively. An airplane-type (i.e. aerodynamic) propeller 34 is rotatably mounted on the engine arbor 76 in a manner which will be described in more detail subsequently. Surrounding the propeller is a propeller guard 20 which in turn is mounted to the pedestal frame with tie rods 40 and brackets 42. A battery 22 is mounted to the rear of the engine which extends forwardly of the propulsion and steering apparatus in the direction of travel since the propeller operates in the "pusher" mode to direct air away from the engine.

The preferred use of this propulsion apparatus is to mount it on an aquatic craft, such as a flat bottomed, or a pontoon supported, boat, which is designed to operate in shallow water, or in water congested with vegetation, or both. Therefore, the shroud 30 is mounted near the aft area of the boat on the deck 8 over a vibration damping material 32. As shown more clearly in FIG. 1, the shroud 30 is open at least on one end and a sprocket wheel 16 is secured to the pedestal shaft 36 with a collar 38.

A throttle control cable 24 extends from the throttle 25 on the engine, into the pedestal shaft 36 and downwardly through the shaft 36 and upper and lower flange bearing housings 14, 18 and through deck 8. At this point, it should be noted that there is nothing preventing or hindering the free swivel of the engine, propeller and pedestal in their free rotation about the axis or shaft 36 which is mounted substantially normal to the deck of the boat. The entire engine, propeller and pedestal of apparatus can start in any radial position and rotate in either direction a full 360° turn for in as many multiples of 360° as desired.

Figure 3:
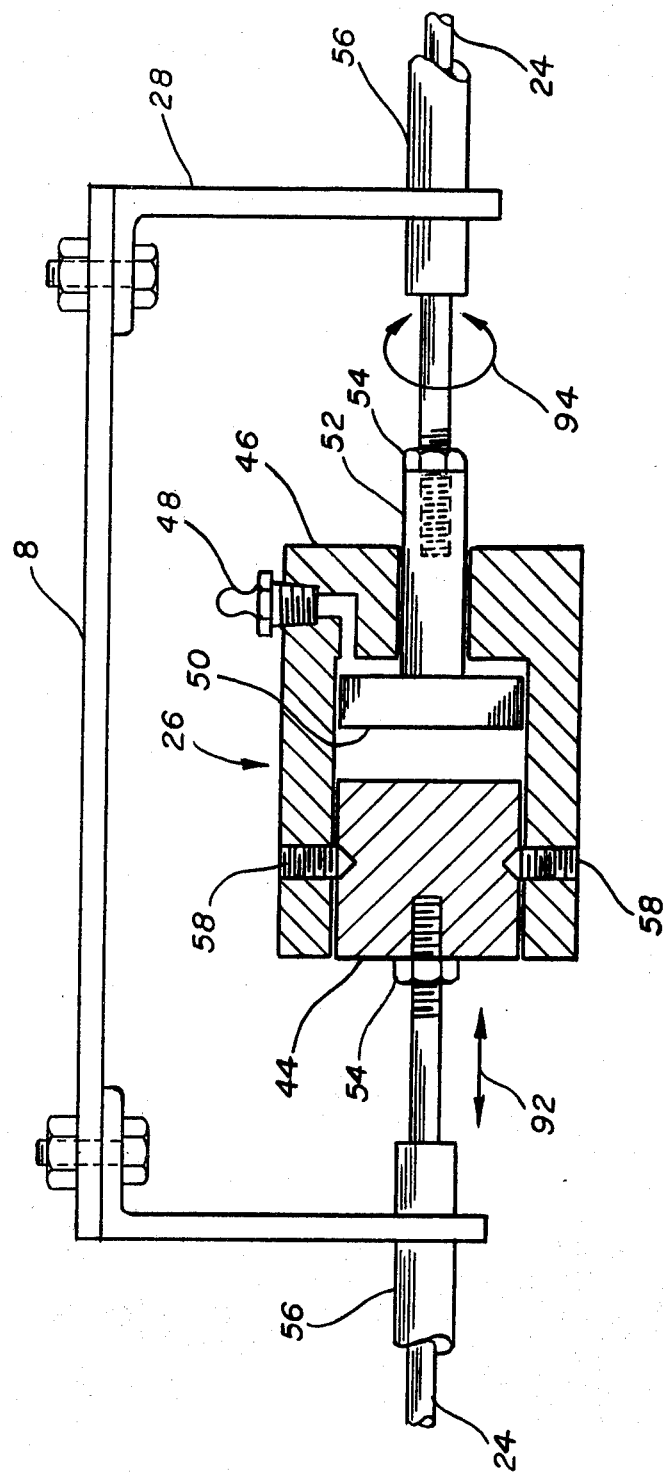
FIG. 3 is a sectional view of the universal coupling linking the throttle control cable with the engine.

As shown in FIG. 3, the end of the throttle control cable 24 which is attached to the engine (throttle) 25 is secured to a cylindrical neck 52 of a disk-like end cap or head 50 by locknut 54. The neck 52 extends outwardly and concentrically of one side of head 50 which in turn is secured for rotatable motion within the body of throttle cable universal coupling 26. The other component parts of coupling 26 comprise a body 46 and an end plug 44 which is secured in the body opposite the other face of head 50 by a plurality of set screws 58. The other end of the throttle control cable 24 is secured into the end plug 44 by a lock nut 54 and is connected at its terminal end to a suitable control for the operator, such as a foot pedal or throttle knob 6. The universal coupling 26 is mounted within a bracket 28 by a pair of sleeves 56 through which the cable 24 is held in position, but which permits both rotational and axial movement of the cable within the sleeves 56.

Figure 4:
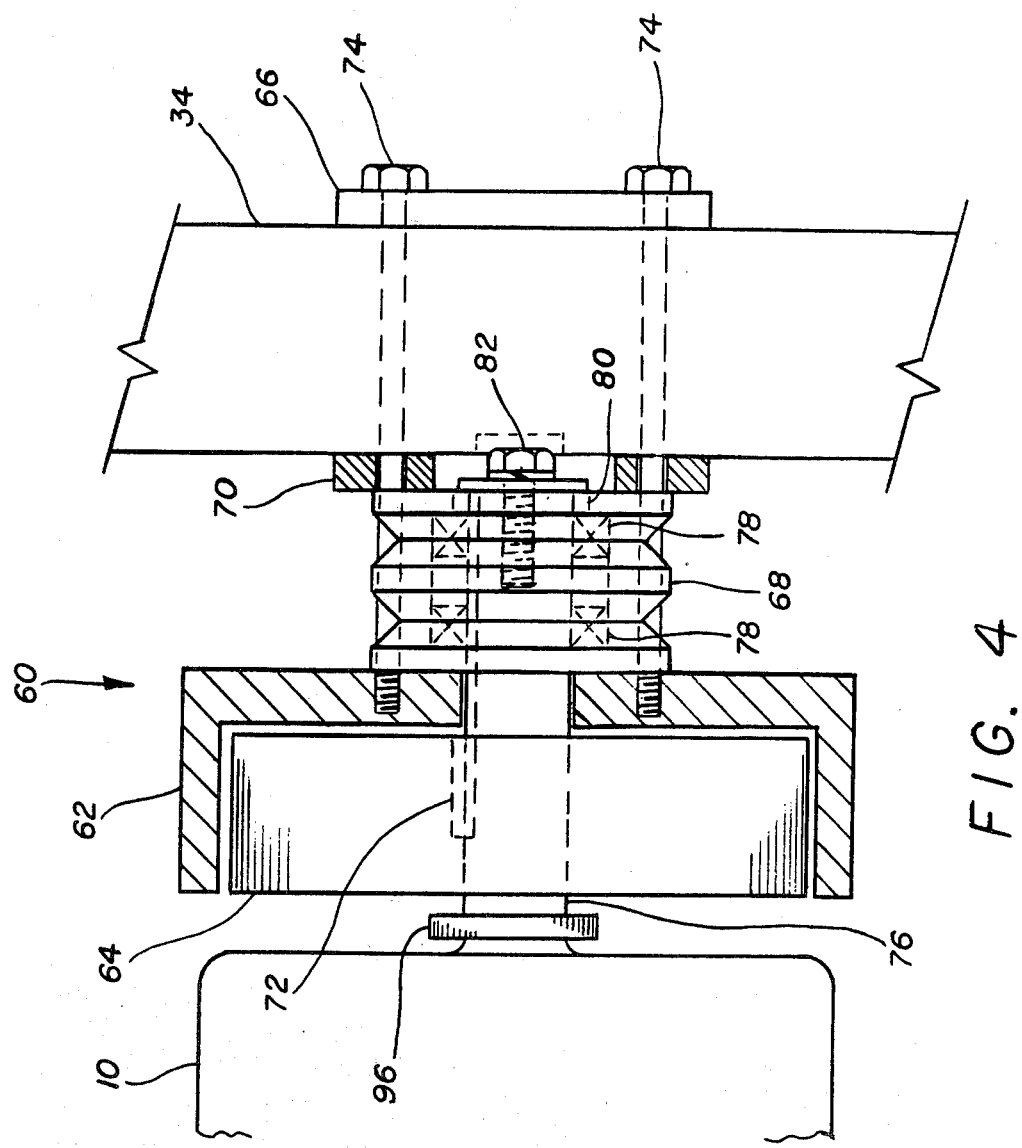
FIG. 4 is a side view, partially in section, showing the propeller and the centrifugal clutch.
Figure 5:
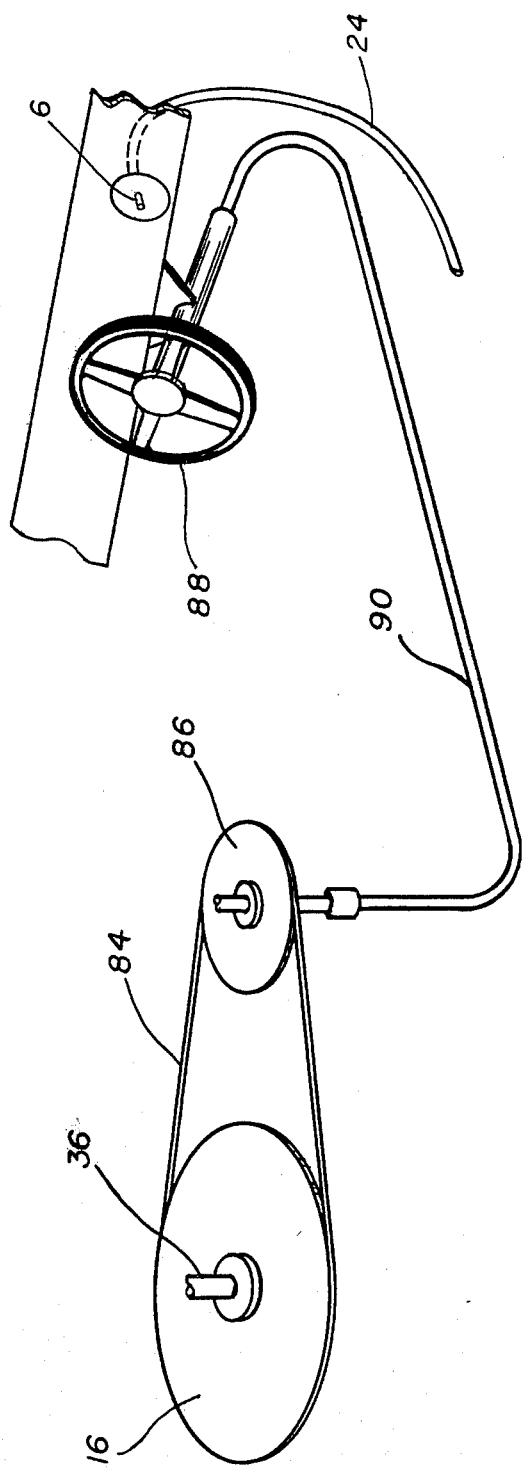
FIG. 5 is a prospective drawing showing how the steering wheel of a craft on which the propulsion apparatus is mounted is linked to the sprocket wheel on the propulsion apparatus.

Referring to FIG. 4, the drive arbor 76 of engine 10 is keyed to the expandable clutch hub 64 with a key 72. A cylindrical clutch collar 62 provides opposed bearing surfaces for engaging the shoes of the clutch hub 64 when the speed of the engine reaches a specified point, for example about 1200 rpm. The propeller 34 is mounted into the collar 62 of clutch 60 via a plurality of bolts 74 through an outer mounting plate 66. The bolts 74 extend through an inner spacer ring 70 and through a support housing 68 in which a bearing 78 is mounted for rotation about engine arbor 76. The bearing 78 is secured within the support housing 68 by a cap screw 82 and a support sleeve 80. The clutch collar 62 is thereby positioned by the bearing 78 for rotatable movement about engine arbor 76. A spacer ring 92 helps position the clutch hub from the engine on arbor 76.

Steering is provided by linking steering wheel 88 mounted in the forward end of the craft with a steering sprocket 86 via a steering cable 90. In turn, steering sprocket 86 is linked to sprocket reel 16 via a chain 84.

In operation, the engine is started while the propulsion apparatus is in any radial position on the pedestal. Since the centrifugal clutch is not actuated at low speeds, the propeller will not turn while the engine is idling. Thus, while the engine arbor 76 and expandable clutch hub keyed thereon rotate, the propeller 34, support housing 68 and clutch collar 62 will not turn while supported on the bearing 78 within the support housing. By turning the steering wheel 88, the entire propulsion apparatus mounted on the pedestal can be positioned to direct the propulsive force in any radial direction about the axis of rotation of shaft 36. When the propulsion apparatus is aligned as desired, the throttle is opened and the engine comes up to the speed where the centrifugal clutch will automatically engage the propeller to initiate movement of the craft on which the propulsion apparatus is mounted.

It will be appreciated that even though the propulsion apparatus is mounted on the pedestal for completely free swiveling action, the degree of swiveling movement would ordinarily be limited by the ability of the throttle control cable to accommodate continued rotational movement in one direction from a given position. Here, the throttle cable universal coupling permits longitudinal, or axial, translation of the cable as shown by the double headed arrow 92. Further, rotational movement of the end of the cable connected to the engine is accommodated by the end of the cable on which the head 50 is secured. This is shown by the double headed directional arrow 94. This rotational movement is facilitated by the presence of grease within the universal coupling which is injected through grease fitting 48.

Thus, the unique universal coupling 26 permits complete, continuous control of the engine throttle and, by virtue of the swivel and centrifugal clutch, the speed and steering of the craft regardless of the direction and extent of rotational movement of the propulsion and steering apparatus. In fact, the universal coupling permits the pedestal on which the propulsion apparatus is mounted to swivel with unlimited freedom for maximum control and convenience in operating the craft.

Thus it is seen that an apparatus has been described which achieves the objectives and provides the features and advantages delineated and inherent in the invention. Clearly, various modifications may be made in the apparatus within the spirit and scope of the invention as disclosed and claimed. For example, the craft on which the propulsion and steering apparatus is mounted could be a wheeled vehicle as well as a boat. Also, the shape of head 50 in the universal coupling can be like a disk with flat face surfaces, or a sphere, or a half sphere.

What is claimed is:

1. Apparatus for providing fluid propulsion and steering in any direction to a craft having operator throttle and steering controls, comprising, in combination:
    an engine having a throttle for controlling its speed;
    means for mounting the engine to the craft to swivel about a substantially vertical axis for unencumbered angular rotational movement thereabout, including more than 360° in either direction from any starting point along the path of rotation;
    an aerodynamic propeller;
    a centrifugal clutch operatively attaching the propeller to the engine whereby the propeller is selectively disengaged and engaged to provide propulsive force as a function of engine speed;
    linkage means secured to the means for mounting the engine to the craft and adapted to be operatively connected to the operator steering control whereby the engine and propeller can be angularly positioned from any location to steer the craft;
    a throttle control cable having two segments with one end of one segment attached to the engine throttle and one end of the other segment connected to the operator throttle control;
    a universal coupling interposed between the segmented sections of the throttle control cable, said coupling having a body member and a head member rotatably secured in the body member for unrestrained rotation therein, the head member being connected to one end of the throttle control cable segment and the other throttle control cable segment attached to the body member with the other end of each segment attached to the operator throttle control and throttle, to thereby permit unlimited rotation of the head member corresponding to unlimited angular rotation of the means for mounting the engine to the craft in either direction to maintain and facilitate control of the engine speed and steering of the craft.

2. In a pivotally mounted fluid propulsion and steering apparatus for providing a radially directed fluid propulsive force to a craft, the apparatus including an engine having means for producing the fluid propulsive force and a throttle control cable linking the engine throttle to an operator throttle control on the craft, the improvement comprising:
    means mounting the engine onto the craft for swiveling movement thereon to permit any desired amount of angular rotation of the engine, including more than 360° in either direction from any starting point along the path of rotation;
    coupling means interposed between coupling ends of segments of the control cable, said coupling means comprising a body member and a head member secured for unrestrained rotation therein, said head and body members attached to respective ones of the coupling ends and the other ends of the segments of cable attached to the engine throttle and operator throttle control to thereby permit axial movement of the cable to control the throttle setting and simultaneous unlimited rotational movement of the end of the cable connected to the engine throttle corresponding to the desired amount of angular swiveling of the propulsion and steering apparatus in either direction to maintain and facilitate control of the engine speed and steering of the craft.

3. Apparatus as set forth in claim 2, wherein:
    the head member is secured to the end of the cable segment leading to the engine throttle.

* * * * *